Patented May 18, 1943

2,319,271

UNITED STATES PATENT OFFICE 2,319,271

HYDROGENATED POLYCYCLOPENTADIENE RESIN

Frank J. Soday, Upper Darby, Pa., assignor to The United Gas Improvement Company, a corporation of Pennsylvania No Drawing. Application March 18, 1939, Serial No. 262,655

11 Claims. (Cl. 260—80)

This invention pertains generally to the hydrogenation of polymerization products, and pertains particularly to the hydrogenation of the soluble type of catalytically polymerized cyclopentadiene.

Cyclopentadiene may be catalytically polymerized into at least two broad types of polymers one of which is characterized by being soluble in solvents, such as benzene, toluene, chloroform, carbon tetrachloride, and high flash naphtha, while the other is characterized by being insoluble in these solvents.

This invention pertains more particularly to the hydrogenation of the first type of polymer which will be referred to hereinafter as soluble polycyclopentadiene.

Soluble polycyclopentadiene is an unsaturated material whose molecular structure apparently comprises a chain of cyclopentadiene residues in which each cyclopentadiene unit contains one double bond as shown by the following suggested formula.

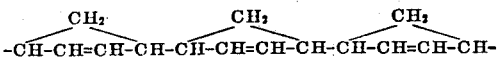

The presence of one double bond in each of the cyclopentadiene units is supported by the fact that this polymer will usually rapidly absorb oxygen to the extent of approximately 24% by weight upon exposure to air in the form of a thin film. Under such circumstances, each oxygen atom presumably attaches itself to and saturates one double bond.

It is found, however, that soluble polycyclopentadiene may contain somewhat less than one double bond per cyclopentadiene unit which is presumably due to the formation of cross linkages between adjacent cyclopentadiene units. The result is a proportionate reduction in the quantity of oxygen absorbed by the resin when exposed to air.

On the other hand, it is found that when tin coated panels are dipped in a solution of polycyclopentadiene and then baked, say for a period of 15 minutes at a temperature of 190° C., the increase by weight, apparently from oxygen absorption, is approximately 28%.

The latter results indicate that oxygen is absorbed at points other than at the double bond when the resin is exposed to more drastic conditions. One explanation is that oxygen bridges are formed between portions of the same polymer molecule or between portions of adjacent polymer molecules.

I have discovered that the physical and chemical characteristics of soluble polycyclopentadiene may be measurably altered, particularly with respect to its capacity to absorb oxygen, by subjecting said soluble polycyclopentadiene to partial or complete hydrogenation.

I have also discovered that despite the teachings of the prior art as exemplified in an article in Industrial and Engineering Chemistry 18, 381 (1926), a light colored product of high quality and completely soluble in ordinary solvents may be obtained by the careful hydrogenation of soluble polycyclopentadiene.

In carrying out the hydrogenation of soluble polycyclopentadiene a solution of the polymer in a solvent is preferably employed. Examples of solvents are benzene, toluene, xylene, and solvent naphtha.

It is found that highly satisfactory results may be obtained by employing a solution of the polymer in a hydrogenated solvent, examples of which are decahydronaphthalene and hexahydrobenzene. The especial suitability of the hydrogenated solvents is perhaps in some way associated with their capacity of absorbing hydrogen or of forming a loose complex or addition compound with hydrogen. The absorbed or loosely held hydrogen is apparently subsequently transfered to the polycyclopentadiene molecule.

To effect the hydrogenation a catalyst is preferably employed.

I find that metals selected from groups VI and VIII of the periodic table are, in general, satisfactory for this purpose.

Examples of such catalysts are nickel and platinum.

Derivatives of such metals may also be employed, an example of which is nickel oxide.

Metals selected from other groups of the periodic table are also effective in catalyzing the reaction. An example of such metals is copper.

Other catalysts may be employed, such as the chromites of copper, zinc and nickel. Activated clay is also suitable.

With respect to the activity of the particular catalyst selected, generally speaking, in the production of the catalyst, methods designed to increase the ratio of surface per unit of mass lead to a corresponding increase in the activity of the catalyst.

Although the hydrogenation may be carried out at atmospheric pressure, super atmospheric pressures are preferably employed since the degree of hydrogenation in a given time is, in general, a function of the pressure. As an example, pressures ranging from 100 to 10,000 pounds per square inch are suitable. Excellent results have been obtained through the use of various pressures ranging from 300 to 1500 pounds per square inch.

Since soluble polycyclopentadiene may be carried to the insoluble state by the application of heat, I prefer to carry out the hydrogenation at temperatures below 200° C., although temperatures in the neighborhood of 200° C. or higher, might be employed, for instance, for shorter periods of time. Temperatures between 25 and 150° C. are satisfactory, while excellent results are secured by employing temperatures between 25 and 100° C.

The time during which the material under treatment is subjected to hydrogenation is, of course, subject to wide variation depending upon the degree of hydrogenation desired.

Generally speaking, and with all other conditions the same, an increase in time will result in an increase in the degree of hydrogenation.

However, the rate of hydrogenation decreases with increase in degree of hydrogenation.

It is found that hydrogen is absorbed very rapidly during the initial stages of the hydrogenation, and that after a short time the rate of hydrogen absorption falls off rapidly until a more or less constant rate is reached. This indicates that the terminal double bonds are rapidly hydrogenated and that the double bond or bonds in the interior of the polymer molecule are much less active.

When soluble polycyclopentadiene is in solution form its handling is facilitated.

The following examples will serve to further illustrate the process.

Example 1

A 946 cc. portion of a solution of soluble polycyclopentadiene in decahydronaphthalene containing 14.8% of the polymer was placed in an autoclave lined with stainless steel and equipped with an agitator.

5 grams of nickel catalyst were added. The autoclave was then closed. Hydrogen was introduced and held at a pressure of 300 pounds per square inch for 24 hours during which time the contents of the autoclave were held at room temperature and subjected to agitation.

After the removal of catalyst by filtration, approximately 940 cc. of a solution of hydrogenated polycyclopentadiene were obtained.

After removal of the solvent the product was found to be light yellow in color and completely soluble in ordinary solvents.

Example 2

A 1000 cc. portion of a 19.8% solution of soluble polycyclopentadiene in benzene was placed in an autoclave in the presence of 1 gram of active nickel catalyst. Hydrogen was introduced and held at a pressure of 600 pounds per square inch for a period of 8 hours, during which time the temperature was held at 80° C. and the contents of the autoclave agitated.

The catalyst was then removed by filtration whereupon 1000 cc. of a clear light yellow solution of hydrogenated polycyclopentadiene were obtained. This hydrogenated polycyclopentadiene was found to be soluble in all ordinary solvents.

Example 3

A 500 cc. portion of a decalin (decahydronaphthalene) solution containing 90 grams of polycyclopentadiene was charged to an autoclave and subjected to a hydrogen atmosphere at a pressure of 600 pounds per square inch in the presence of 5 grams of active nickel catalyst while agitating and maintaining the temperature at 80° C.

At the end of three hours an additional 5 gram portion of the catalyst was added and the hydrogenation continued as before.

At the end of 27 hours the catalyst was removed by filtration whereupon a clear light yellow solution of hydrogenated polycyclopentadiene was obtained.

Example 4

A 475 gram portion of a 20% solution of soluble polycyclopentadiene was placed in an autoclave in the presence of 1.9 grams of platinum black, prepared according to the directions of Bruce, Journal of American Chemical Society 58, 689. Hydrogen was introduced and held at a pressure of 575 pounds per square inch for a period of 6 hours, during which time the temperature was held at 80° C. and the contents of the autoclave agitated.

The catalyst was then removed by filtration in a super-centrifuge, whereupon approximately 475 grams of a clear light yellow solution of hydrogenated polycyclopentadiene were obtained.

Example 5

A 500 gram portion of a 20% solution of soluble polycyclopentadiene in cyclohexane, previously prepared by the polymerization of cyclopentadiene by means of a clay catalyst, was placed in an autoclave, together with 13 grams of an activated nickel catalyst, and hydrogenated under a pressure of 300 pounds per square inch and a temperature of 100° C. The hydrogenation was continued for a period of 10 hours with good agitation.

The catalyst was then removed by filtration, whereupon approximately 300 grams of a colorless solution of hydrogenated soluble polycyclopentadiene was obtained.

A sample of this hydrogenated material was titrated with bromine according to the McIlheny method with negative results, indicating that the polycyclopentadiene was completely hydrogenated.

Each of the products obtained in the foregoing examples possessed excellent coating properties when incorporated in liquid coating compositions. An example of a liquid coating composition is a solution of the hydrogenated polycyclopentadiene in a solvent such as benzene, toluene, xylene, high flash naphtha, carbon tetrachloride, solvent naphtha, etc.

Polycyclopentadiene which has been partially or completely hydrogenerated is ideally suited to the coating of all types of surfaces including surfaces of wood, fiber board, asbestos, concrete, brick, building materials in general, glass, ceramics and of metal including iron, steel, magnesium (Dow metal), zinc, stainless steel, copper, bronze, brass, tin, aluminum and lead surfaces.

For example, coatings of from 4.0 to 5.0 milligrams per square inch have been prepared on tin, copper, glass, magnesium, and zinc panels by applying a solution of soluble hydrogenated polycyclopentadiene to the respective panels, followed by baking at a temperature of 150° C. for 15 minutes. Air drying might have been substituted for baking. The films adhered well to the respective surfaces and possessed good durability characteristics.

Additional panels were then coated in a similar manner, after which a vinylite (vinyl chloride-vinyl acetate co-polymer) topcoat of approximately 4.0 milligrams per square inch was applied to each of the coated panels. The vinylite coating adhered tenaciously to the undercoat in each case.

Surface films thus produced possess excellent alkali, acid and water resistence.

The material is excellently adapted to the coating of containers for foods and beverages, such as the container more commonly known in the trade as the tin can.

It is a well recognized fact that a tin coating for metal food containers is, in many instances, unsatisfactory even though the containers are hermetically sealed. In the case of grape juice, for instance, tin is dissolved on long standing to degrade the product and should the smallest hole develop in the tin lining, a reaction is set up which soon finds its way to the outer surface of the can thus causing it to leak.

It is the custom after a can has been sealed to subject it and its contents to a sterilization treatment with heat. This increased temperature greatly accelerates any reactions that are capable of taking place.

The introduction of the sealed can in the beverage trade has increased enormously the demand for a completely inert lining incapable of modifying the taste of the beverage. This applies particularly in the case of beer.

As a result of the foregoing, the art has sought to find a lacquer which might be applied over or substituted for the tin coating. It was found, however, that lacquers generally either failed to form a suitable bond with the metal surface so as to adhere firmly thereto, or if a proper bond was formed, the lacquer film failed to resist reaction with foods.

Since it is desirable to apply the lacquer coating to the sheet metal before the can or other object is made up, the bonding properties of the lacquer must be such as to withstand bending, pressing, shaping, stamping, and so forth, without cracking or losing adhesion.

In addition to the foregoing, the lacquer coating must have an acceptable appearance, preferably suggesting utmost cleanliness. This is because the usual housewife looks with great disfavor upon any discoloration of the inside surface of a can when removing food therefrom.

The lacquer also should be completely odorless and tasteless in order not to impair the flavor or odor of the canned food product in any way.

Satisfactory surface films may be produced by applying to surfaces in general, and metal surfaces such as those of tin and iron in particular, a liquid coating composition having as a base my new resin and then baking or air-drying the coating thus applied or permitting it to dry in any other suitable atmosphere.

Coating of sheet metal may be accomplished in any desired manner, such as by spraying, roller coating, or brushing. Finished cans might be coated by spraying, brushing, dipping, or otherwise.

Since such films show a relatively high degree of alkali, acid and water resistance, they are particularly suitable for food container purposes.

Liquid coating compositions may be made by dissolving my hydrogenated polycyclopentadiene in volatile solvents or by incorporating it in varnishes, or otherwise. The adherence to the metal is unusually tenacious.

The use of my new hydrogenated polycyclopentadiene is by no means restricted to the formation of a single film system.

For instance, it may be used as a primer coat for another resinous coating compound, such as one of lesser bonding properties, for example, a polymerized vinyl compound, such as is obtained by the co-polymerization of vinyl chloride and vinyl acetate.

This applies particularly in the case of metal food containers.

On the other hand, if desired, it may be used as a top coat applied over some other primer coat.

It will, of course, be understood that a coat may be built up with one or more applications of the coating material.

Other uses to which hydrogenated polycyclopentadiene may be put are as follows:

1. As an adhesive, such as in the preparation of laminated products (cloth, paper, wood, etc.), and in the preparation of gummed products, such as in adhesive tapes.
2. Coatings in which good dielectric properties are essential, such as in the preparation of electrical insulating coatings.
3. As an ingredient in coating compositions in general.
4. As an ingredient in chewing gum and chewing gum bases.

Adhesives may be prepared from hydrogenated polycyclopentadiene resin by incorporating therein certain portions of unvulcanized rubber, such as crude plantation crepe. A representative formula is the following.

*Example 6*

| | Parts |
|---|---|
| Hydrogenated polycyclopentadiene | 5 |
| Amber plantation crepe | 100 |

The rubber may be incorporated in the hydrogenated polycyclopentadiene resin by any desired means, such as by calendering or mastication. Any desired ageing or curing process or procedure may be used therewith.

Hydrogenated polycyclopentadiene may be used in the preparation of chewing gum bases, a representative formula being the following.

*Example 7*

| | Parts |
|---|---|
| Chicle | 65 |
| Hydrogenated polycyclopentadiene | 35 |

The ingredients are compounded in any desired manner, such as by mastication at elevated temperatures. Additional ingredients, such as flavoring materials (wintergreen oil) and cocoa may be added as desired.

The oxygen absorption of my new hydrogenated polycyclopentadiene as compared to the unhydrogenated material is reduced more or less proportionately to the degree of hydrogenation effected. The degree of hydrogenation desired can be controlled within very narrow limits by a choice of operating conditions, such as concentration of polycyclopentadiene, the choice of catalyst used in preparing the polycyclopentadiene, the nature of the solvent employed, the type and quantity of catalyst used, the temperature and pressure employed, and the time employed.

For instance, when the product produced in Example 1 was compared to unhydrogenated polycyclopentadiene, the capacity to absorb oxygen was found to have been reduced by 50%.

On the other hand, the product obtained in Example 5 was completely hydrogenated, since the capacity to absorb oxygen was entirely lacking.

In general, partially reduced soluble polycyclopentadiene may be used for all coating purposes, either alone as a mixture with some other coating material or composition, or in conjunction with some other coating material or composition.

Completely reduced hydrogenated soluble polycyclopentadiene may be used for coating purposes in general, or as a wax or inert gum. For example, it may be used as a chewing gum base.

I have found that the manner in which the soluble polycyclopentadiene is produced in a measure affects the ease of polymerization in that soluble polymer made with the halide type of catalyst such as the metallic halides (when these catalysts can be employed) or with metallic halide-organic solvent complexes, is more difficultly hydrogenated than soluble polymer made with halide-free catalysts, such as activated clay. The term metallic halide, as employed here, includes boron halides.

Furthermore, the products appear to have different characteristics.

The metallic halide type of catalyst will be referred to herein as an "acid-acting metallic halide catalyst."

The soluble polymer hydrogenated in Examples 1 and 4 was made as follows:

A mixture comprising 23 cc. of aluminum chloride-diethyl ether complex and 15 pounds of benzene was slowly added with agitation to a mixture comprising 5 pounds of benzene and 5 pounds of cyclopentadiene over a period of 2 hours. The temperature was maintained between 6 and 10° C. during this period. Agitation was continued for an additional hour after which a sufficient quantity of a 15% sodium carbonate solution to completely hydrolyze the catalyst was added. 6 pounds of benzene and 400 grams of lime were then added with agitation and the mixture was permitted to stand overnight.

After filtration the solution was concentrated by distillation under reduced pressure and 24 pounds of a 14% solution of polycyclopentadiene in benzene was obtained. Reference is made to my copending application Serial Number 204,786, filed April 28, 1938.

Decahydronaphthalene was substituted for benzene in this solution as follows:

214 ounces of decahydronaphthalene were added and the mixture distilled at a pressure of 140 mm. for a period of 3 hours. 16½ pounds of a 20% solution of polycyclopentadiene in decahydronaphthalene was thus obtained. Sufficient decahydronaphthalene was added to the solution to bring the concentration down to 14.8%, the concentration of the starting material in Example 1.

The polycyclopentadiene employed in Example 2 was prepared as follows:

A mixture comprising 3 cc. of boron trifluoride-diethyl ether complex and 1800 grams of benzene was slowly added to a mixture comprising 600 grams of benzene and 600 grams of cyclopentadiene with agitation over a period of 2 hours while maintaining the temperature at 25° C. Agitation was continued for an additional two hours followed by the addition of a sufficient quantity of a 15% solution of sodium carbonate to completely neutralize the catalyst. After filtration the solution was dried over lime. A polycyclopentadiene yield of 85% was secured in the form of a 19.8% solution, the concentration of the starting material in Example 2. Reference is had to copending application Serial Number 194,523, filed March 8, 1938, by Samuel G. Trepp.

The polycyclopentadiene employed in Example 3 was prepared by the addition of decalin to a solution of soluble polycyclopentadiene prepared as in Example 2, followed by the removal of the benzene by distillation under reduced pressure.

The polycyclopentadiene employed in Example 5 was prepared as follows:

A mixture of 50 parts of cyclopentadiene and 50 parts of toluene was polymerized with 15 parts of a naturally occurring active clay (known commercially as Halclay) at a temperature of 30-35° C. A quantity of cyclohexane was then added to the mixture, the solution filtered, and the toluene removed by distillation under reduced pressure. A solution of polycyclopentadiene in cyclohexane was thus secured.

The activated nickel catalyst employed in Examples 1, 2, 3, and 5 was prepared as follows:

10 grams of a finely ground alloy containing equal parts of nickel and aluminum were added to a solution comprising 10 grams of sodium hydroxide in 43 cc. of distilled water. This was followed by heating on a hot plate at a temperature of 212° F. for two hours with occasional stirring and occasional replacement of water.

After the two hour period the mixture was heated to 300° F. during which considerable water was lost. The mixture was then cooled and 50 cc. of water added. This was followed by heating to dissolve residual sodium hydroxide. After cooling the liquid was decanted and the residue was washed with distilled water until the washings were neutral to litmus.

50 cc. of decahydronaphthalene were added to the residue and the solution was heated until all traces of water had been removed. Active nickel catalyst was thus obtained.

Since metallic catalysts are readily poisoned by substances, such as thiophene, sulfur, arsenic, mercury, phosphorous, chlorine, bromine, iodine, lime, potassium hydroxide, selenium, glycerine, cyanides, and certain organic acids, care should be taken to avoid the presence of materials of this character during the hydrogenation step. Accordingly, benzene containing any substantial quantity of thiophene or sulfur is preferably avoided.

The starting material should also preferably be free from such substances.

However, catalyst poisons might be removed from solutions of the starting material in a number of ways of which the following are examples.

Finely divided metal or other active material, such as charcoal is added to the resin solution with thorough agitation. The impurities are adsorbed by the active material which is then removed by filtraton.

Another way of removing catalyst poisons involves the percolation of the solution through a bed of finely divided metal or other active material followed by clarification.

On the other hand, the action of any catalyst poison may be retarded by adding the catalyst in several successive portions to the material undergoing hydrogenation instead of all at once which is the customary procedure.

In the claims the term "hydrogenated polycyclopentadiene" or its equivalent, unless otherwise modified, is intended to embrace polycyclopentadiene which has been at least partially hydrogenated.

In the claims the terms "benzene-soluble" and "characterized by relatively high solubility in benzene" are intended to denote solubility characteristics only. Therefore, it is to be understood that the presence or absence of benzene is not implied by these terms.

It is to be understood that the above particular description is by way of illustration and that changes, omissions, additions, substitutions, and/or modifications might be made within the scope of the claims without departing from the spirit of the invention which is intended to be limited only as required by the prior art.

I claim:

1. In a process for preparing hydrogenated polycyclopentadiene characterized by relatively high solubility in benzene, the step of subjecting benzene-soluble resinous polycyclopentadiene resulting from the catalytic polymerization of cyclopentadiene and after the substantially complete removal of polymerization catalyst therefrom to hydrogenating conditions, the resulting product ranging from light in color to colorless in character.

2. A process for preparing hydrogenated polycyclopentadiene characterized by relatively high solubility in benzene, comprising subjecting cyclopentadiene to catalytic polymerization with an acid-acting metallic halide catalyst in a manner to produce benzene-soluble resinous polycyclopentadiene, substantially completely removing polymerization catalyst from said benzene-soluble resinous polycyclopentadiene by substantially completely hydrolyzing said catalyst and removing the resulting hydrolysis products, thereafter subjecting said benzene-soluble resinous polycyclopentadiene substantially free from polymerization catalyst to hydrogenating conditions in the presence of a hydrogenation catalyst, and after a desired degree of hydrogenation removing the hydrogenation catalyst from the resulting product.

3. In a process for preparing hydrogenated polycyclopentadiene characterized by relatively high solubility in benzene, the step of subjecting benzene-soluble resinous polycyclopentadiene resulting from the catalytic polymerization of cyclopentadiene and after the substantiallly complete removal of polymerization catalyst therefrom to hydrogenating conditions in the presence of a hydrogenation catalyst at a temperature below 200° C. and a hydrogen pressure above 100 pounds per square inch.

4. In a process for preparing hydrogenated polycyclopentadiene characterized by relatively high solubility in benzene, the step of subjecting benzene-soluble resinous polycyclopentadiene resulting from the catalytic polymerization of cyclopentadiene and after the substantiallly complete removal of polymerization catalyst therefrom to hydrogenating conditions at a temperature below 200° C. and a hydrogen pressure above 100 pounds per square inch and in the presence of a hydrogenation catalyst selected from metals of groups 6 and 8 of the periodic system.

5. In a process for preparing hydrogenated polycyclopentadiene characterized by relatively high solubility in benzene, the step of subjecting benzene-soluble resinous polycyclopentadiene resulting from the catalytic polymerization of cyclopentadiene and after the substantially complete removal of polymerization catalyst therefrom to hydrogenating conditions in the presence of activated nickel at a temperature below 200° C. and a hydrogen pressure above 100 pounds per square inch.

6. In a process for preparing hydrogenated polycyclopentadiene characterized by relatively high solubility in benzene, the step of subjecting benzene-soluble resinous polycyclopentadiene resulting from the catalytic polymerization of cyclopentadiene and after the substantially complete removal of polymerization catalyst therefrom to hydrogenating conditions in the presence of activated platinum at a temperature below 200° C. and a hydrogen pressure above 100 pounds per square inch.

7. In a process for preparing hydrogenated polycyclopentadiene characterized by relatively high solubility in benzene, the step of subjecting benzene-soluble resinous polycyclopentadiene resulting from the catalytic polymerization of cyclopentadiene with activated clay as catalyst and after the substantially complete removal of polymerization catalyst therefrom to hydrogenating conditions, the resulting products ranging from light in color to colorless in character.

8. The product of the process of claim 1.

9. The product of the process of claim 2.

10. The product of the process of claim 7.

11. Benzene-soluble hydrogenated benzene-soluble resinous polycyclopentadiene, said product ranging from light in color to colorless in character.

FRANK J. SODAY.